No. 784,936. PATENTED MAR. 14, 1905.
J. H. GREENSTREET.
NAILING MACHINE.
APPLICATION FILED AUG. 13, 1903.

Witnesses
Chas N Leonard.
J A Walsh.

Inventor
Jason H. Greenstreet,
by Bradford & Hood,
Attorneys

No. 784,936. PATENTED MAR. 14, 1905.
J. H. GREENSTREET.
NAILING MACHINE.
APPLICATION FILED AUG. 13, 1903.

Witnesses
Chas N Leonard
J. A. Walsh

Inventor
Jason H. Greenstreet,
by
Bradford & Hood,
Attorneys

No. 784,936. PATENTED MAR. 14, 1905.
J. H. GREENSTREET.
NAILING MACHINE.
APPLICATION FILED AUG. 13, 1903.

Witnesses
Chas N Leonard.
J. A. Walsh.

Inventor
Jason H. Greenstreet.
by Bradford & Hood,
Attorneys

No. 784,936. Patented March 14, 1905.

UNITED STATES PATENT OFFICE.

JASON H. GREENSTREET, OF INDIANAPOLIS, INDIANA.

NAILING-MACHINE.

SPECIFICATION forming part of Letters Patent No. 784,936, dated March 14, 1905.

Application filed August 13, 1903. Serial No. 169,361.

*To all whom it may concern:*

Be it known that I, JASON H. GREENSTREET, a citizen of the United States, residing at Indianapolis, in the county of Marion and State of Indiana, have invented certain new and useful Improvements in Nailing-Machines, of which the following is a specification.

In the manufacture of boxes the "box-shooks" (by the term "box-shooks" I mean the ends, bottoms, sides, and tops as they are prepared to be assembled and nailed together to form the boxes) and partly-nailed boxes are subject to repeated handlings, and in most cases the boxes are operated upon by a multiplicity of nailing-machines, it being impracticable to finish a box of varying diameters on a single machine of the usual type, as the distances need to be adjusted to suit the size of the box in all cases, and such adjustments, if attempted for each individual box, would occasion too great a waste of time.

A leading object of my invention, therefore, is to produce a machine upon which the nailing of box-shooks together in forming a box may be accomplished without readjustment and irrespective of whether or not the diameters of the box vary.

A further object is to reduce the handling of the shooks and partly-completed box to a minimum, thus economizing time.

Further objects will appear hereinafter.

Referring to the accompanying drawings, which are made a part hereof, and on which similar reference characters indicate similar parts.

As hereinbefore indicated, the machine illustrated is in many respects of a well-known character. In so far as the means for delivering and driving the nails is concerned I have made no changes in said machine. Such parts and devices may therefore be understood to be of an ordinary or any desired construction, and as my invention is not limited thereto these parts will either not be described at all or only incidentally referred to in describing my invention.

Upon an ordinary platform or table 21 I mount suitable standards 22 and 23, in the upper end of which are bearings 24 and 25 for the spindles of the box-head chucks, which chucks form a leading feature of my present invention. These bearings, as is clearly shown in the drawings, are preferably inclined slightly, for a purpose which will be presently described. These box-head chucks, although one has certain valuable features not shown in the other, are in most respects alike, so that the description of one is substantially a description of the other. The standards 22 and 23, carrying the box-head chucks, are adjustable toward and from each other in order to accommodate boxes of varying lengths. I have shown as means for securing these standards to the table 21 the clamping-strips 20 and have shown them as secured to the table by the bolts 19; but any appropriate means which admits of adjustment may of course be employed.

The box-head chucks are each composed of a spindle 31, which rests in its bearing in the appropriate standard, and a plate 32, mounted on said spindle. Upon the face of the plate at three sides are the flanges 33, 34, and 35, each of which flanges is adapted to support an edge of a head of the box while the appropriate shook (generally side) is being nailed onto the opposite edge. It should perhaps be here remarked that in the manufacture of boxes at first only the two sides and the bottom are nailed on, leaving the cover to be nailed on after the box has been packed, and consequently, therefore, these box-head chucks need only three instead of four flanges each. Upon the central flange 35 is an extension 36, upon which is mounted a spring or yielding support 37, which serves to support the box-heads when first inserted into the machine and hold them against their guides until they are nailed. The flanges 33, 34, and 35 are adjustable in order to accommodate boxes of varying sizes and are capable of being moved over the face of the plate 32 by screws 43, 44, and 45, respectively. As will be readily seen, by turning these screws the box-head-supporting flanges may be adjusted to any point desired and any-sized box-head within the capacity of the machine thus arranged for. These box-head chucks, with their adjustable supporting-flanges, are a very important feature of my invention. By adjusting the flanges properly it is possible to bring the nailing-heads into proper relation to the box notwithstanding varying diameters of the latter, it only being necessary to arrange the flanges 33 and 34 equidistant from the axial line on which the box-head chuck turns and to arrange the flange 35 such a distance from the axial line as will bring the bottom of the box when turned up for nailing to approximately the same level that the sides have been brought by the flanges 33 and 34. It is thus possible by the use of this invention to conveniently and successively nail on the bottom as well as the sides of the box without removing the partly-completed box from the machine, and as the only movement necessary is to rotate the box-head chucks on their axes this is done with much greater rapidity than the usual necessary shifting about of a partly-completed box in the ordinary operation of nailing.

Figure 4:
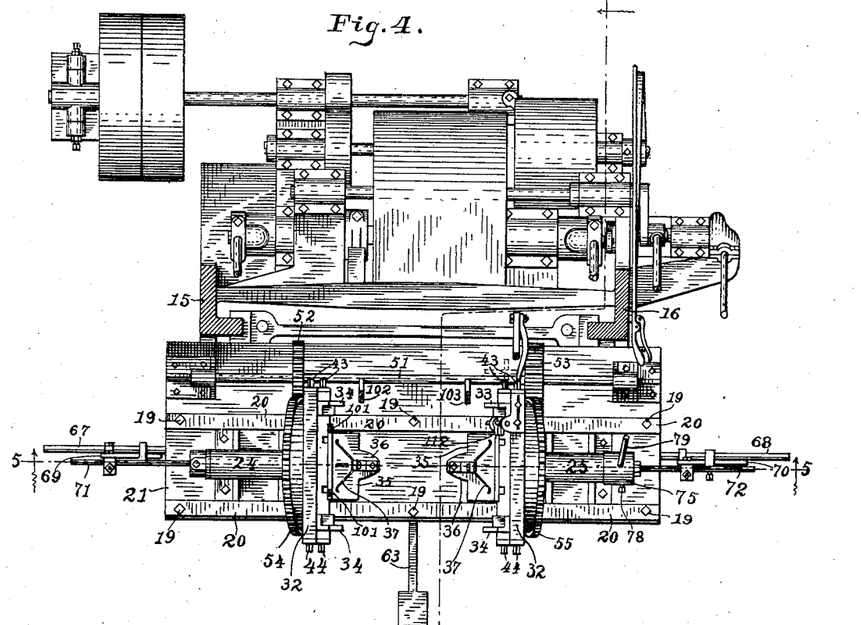
Fig. 4, a horizontal sectional view looking downwardly from the dotted line 4 4 in Fig. 1.

It is of course necessary that the two box-head chucks when revolved should move substantially in unison. This can be accomplished in any of several ways; but a simple and preferable way is to provide (at a convenient point alongside the chucks) a shaft 51, upon which I mount spur-gears 52 and 53, which mesh with spur-gear rims 54 and 55 on the said box-head chucks, respectively. As the box-head chucks are adjusted toward and from each other these gears are correspondingly adjusted along the shaft. As best shown in Fig. 4, one of these gears, 53, has a wider face than the other, which permits the slight shifting of the box-head chuck driven thereby, which will be presently described, without throwing the gears out of engagement.

It may be here remarked that the whole platform 21 is capable of being raised and lowered (according to requirements) in a usual well-known manner by means of the screws 17 and 18, the table being mounted, by means of slides, on the adjacent uprights 15 and 16 of the main machine-frame.

The box-head chucks may be revolved in use in any desired manner; but I prefer to move them by hand. They are locked to position when moved by latch-pins 61 and 62, which are operated from a treadle 63 (see especially Fig. 1) through adjustable links 64, bell-crank levers 65 and 66, links 67 and 68, levers 69 and 70, and links 71 and 72. The connections between the links 67, 68, 71, and 72 and the levers 69 and 70 are adjustable in order that the adjustment heretofore described of the bearings carrying the box-head chucks may be conveniently made without disturbing the connections. The latches are held into engagement with the corresponding notches in the box-head-chuck plates by any suitable means, as a spring 60, which (in the arrangement shown) operates to hold both of the latch-rods inwardly.

Figure 1:
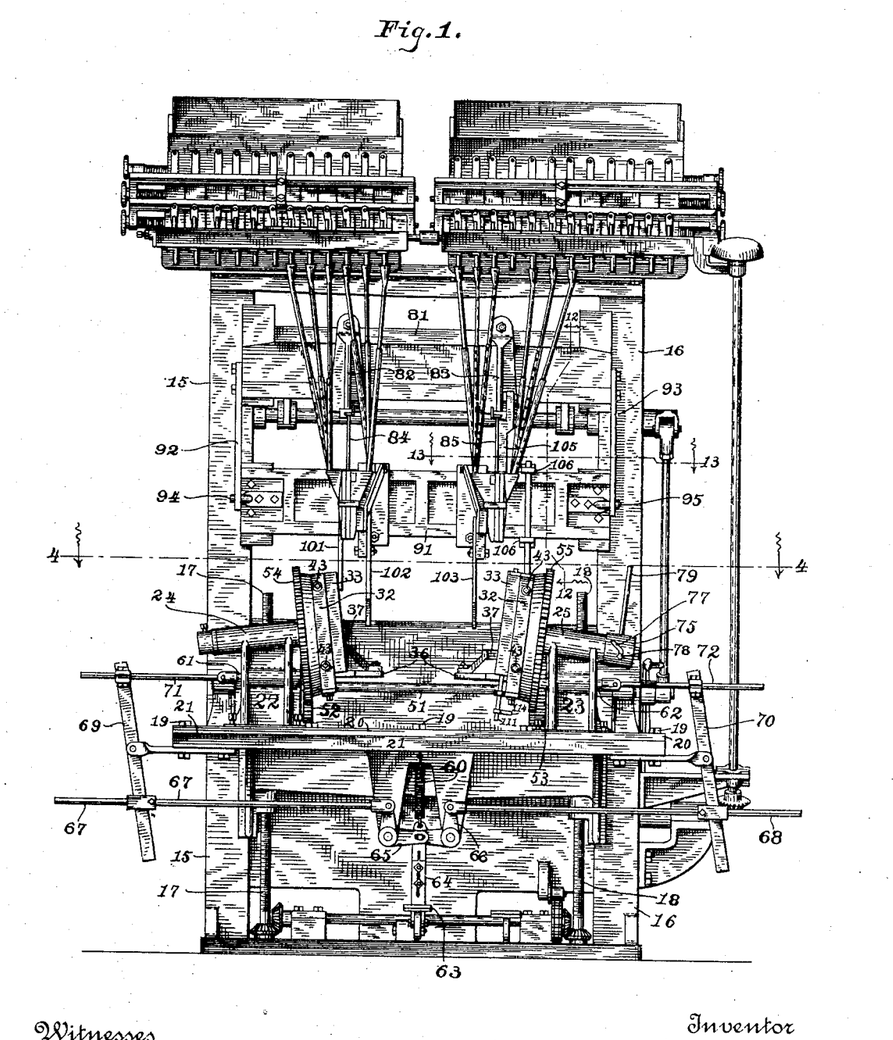
Figure 1 is a front elevation of a box-nailing machine in many respects of a well-known type, but containing a construction embodying my present invention.
Figures 7, 8, 9, 10, 11:
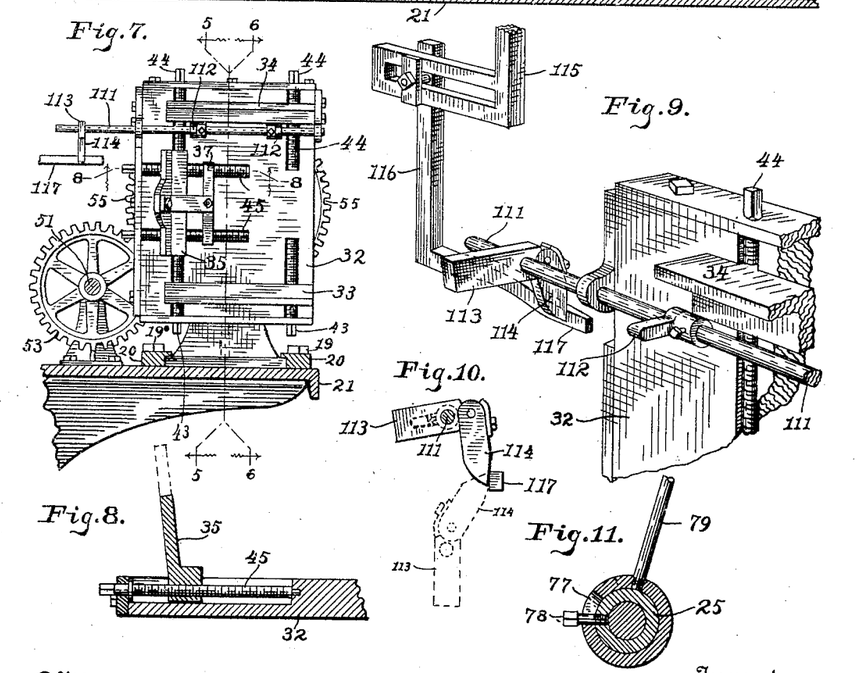
Fig. 7, an elevation of the face of one of the box-head chucks as seen when looking in the direction indicated by the arrows from the dotted line 7 7 in Fig. 5.
Fig. 8, a detail sectional view at the point indicated by the dotted line 8 8 in Fig. 7.
Fig. 9, a detail perspective view illustrating the cam for holding the box-heads into position before they are nailed and the mechanism for operating it.
Fig. 10, a side elevation of a part of said mechanism and illustrating a second position thereof by means of dotted lines.
Fig. 11, a detail sectional view illustrating the means of withdrawing one of the box-head chucks to a greater distance from the other, thus enabling the box to be more conveniently removed therefrom.

It is desirable in order that the boxes when nailed may be quickly and freely removed that one of the box-head chucks should be capable of a slight axial movement. I provide for this by placing a cap 75 over the end of the bearing 25, and this I connect to the spindle 39 (which corresponds in other respects to the spindle 31) by means of the bolt 76. As shown in Figs. 1 and 11, this cap 75 contains a diagonal slot 77, and a stud 78, rigidly mounted in bearing 25, extends out through said slot. The cap 75 is provided with a handle 79, by means of which it can be rotated. Such rotation, as will be readily understood, has the effect to move the spindle 39 longitudinally of its bearing as the sides of the diagonal slot 77 engage with the stud 78. As shown in Fig. 1, that end of the slot where the stud rests when the box-head chuck is in its innermost position is arranged transversely of the bearing instead of diagonally, so that when the parts reach the position shown by Fig. 1 the box-head chuck is held securely against outward movement.

Figure 2:
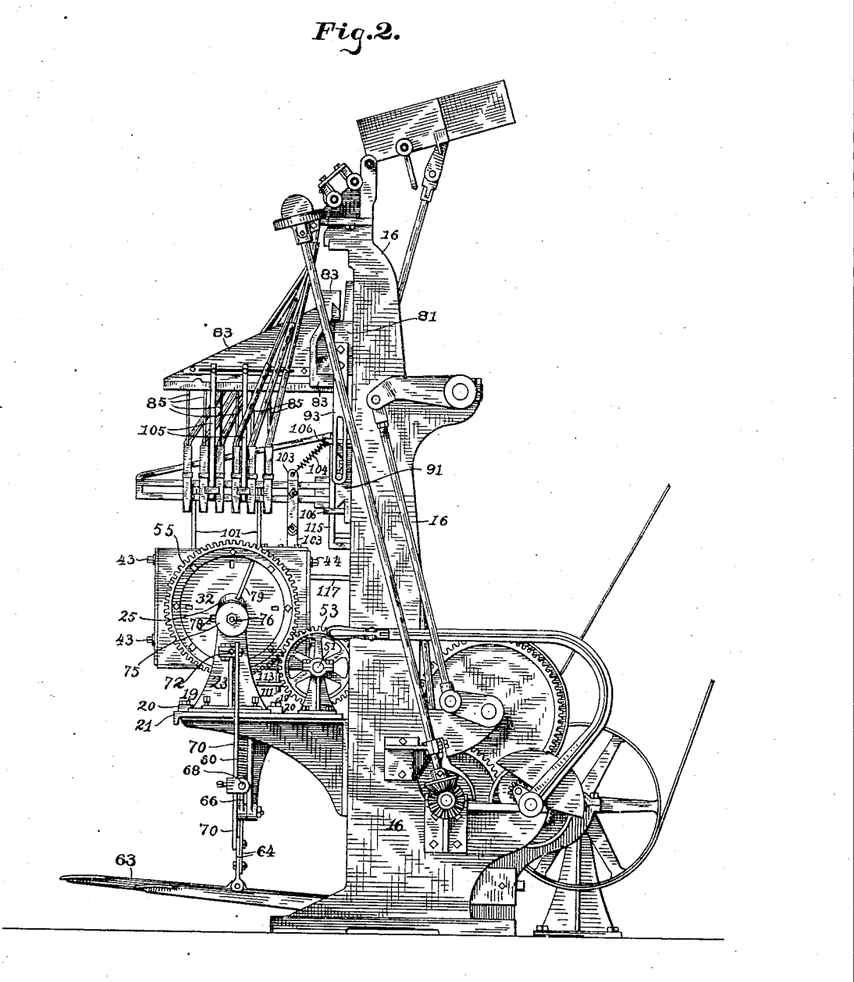
Fig. 2, an elevation of the right-hand side thereof.
Figure 3:
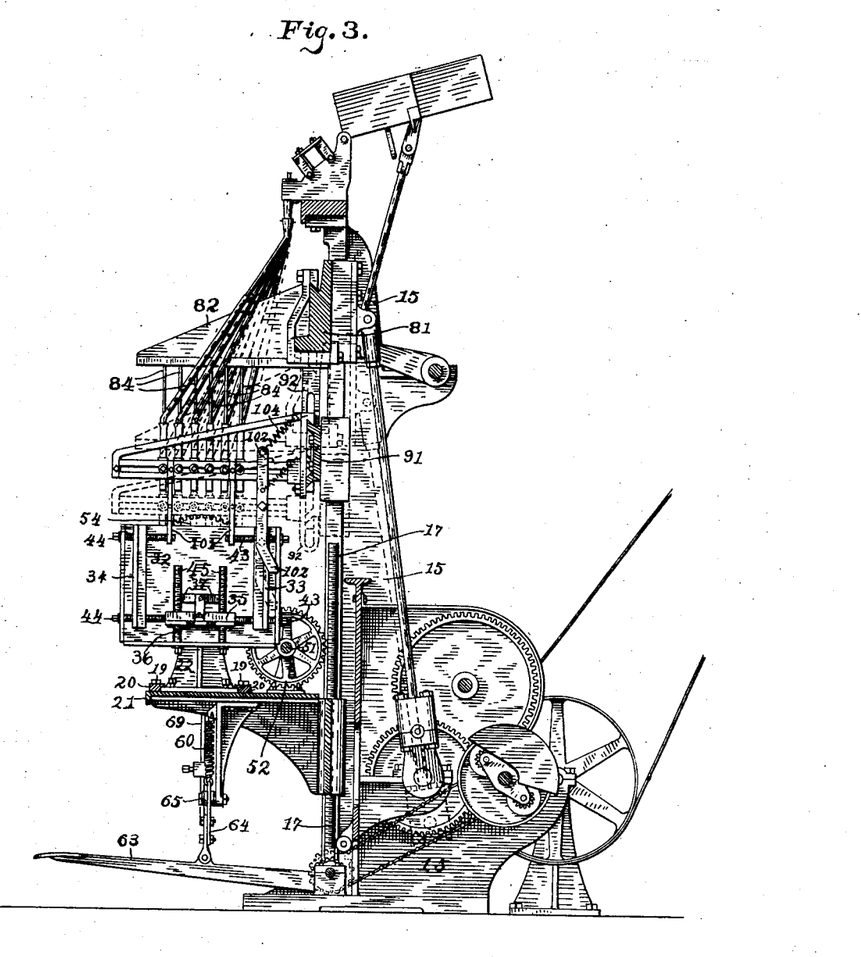
Fig. 3, a central vertical sectional view as seen when looking in the direction indicated by the arrows from the dotted line 3 3 in Fig. 4.

The nailing-head is composed, as is common in machines of this character, of a cross-head 81 and a pair of arms or brackets 82 and 83 thereon, which operate the nail-driving rods 84 and 85. Below this is another cross-bar 91, carrying the nail-chucks in the ordinary and well-known manner. This cross-head 91, however, instead of being fixedly secured to the frame-uprights 15 and 16, as is common, is slidably mounted thereon and is connected (in the construction shown by means of the links 92 and 93) with the cross-head 81, carrying the nailers. By means of these links or other suitable connections the nail-chuck-carrying cross-bar is caused to move toward and from the box being nailed concurrently with the nail-driving cross-head, so that the nail-chucks are raised as the drivers are raised sufficiently to permit the box to revolve without being removed from the chuck which carries it. It is, however, necessary that the driver should have an additional movement independently of the nail-chucks. The links 92 and 93 are therefore (in the construction shown) slotted, as best shown in Fig. 2, and the gudgeons 94 and 95, which connect the cross-head 91 to said links, enter said slots and are capable of moving therein. The result is that as the drivers descend the nail-chucks descend with them until said nail-chucks come close to or in contact with the box being nailed, when the movement ceases, while the drivers continue on the necessary distance to drive the nails. In returning the drivers start upwardly first and move alone until the lower ends of the slots come in contact with the gudgeons 94 and 95, when the cross-head carrying the nail-chucks is moved upwardly with the cross-head carrying the drivers the remainder of its stroke.

Figure 6:
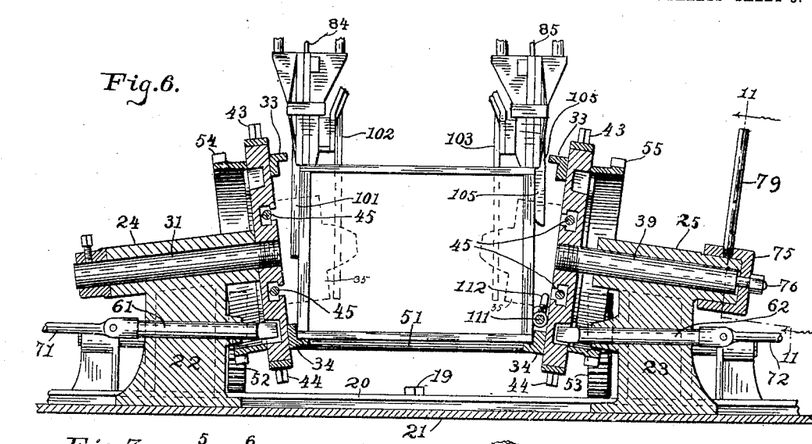
Fig. 6, a view similar to Fig. 5, but showing the parts as they appear at the instant of nailing on the second side of the box with the nailing-heads in contact therewith.

In order to secure the best results and secure the most rapid work, it is necessary that automatically-operated guides for the box-shooks should be provided. At the left these may be simply downwardly-extending fingers 101, secured to the nail-chuck brackets. At the rear I have shown them as bars 102 and 103, pivoted to the nail-chuck brackets and yieldingly held to position by means of springs 104, connecting their tops to the cross-head 91. It is necessary that these guides should be yielding to enable the partly-completed box to be revolved during the operation of nailing. At the right these guides are in the form of plungers 105, which pass down through bearings 106 and 107 (see Fig. 12) on the nail-chuck brackets and are operated from the driver-bracket 83. The lower ends of these guides 105 are beveled, (see Fig. 6,) so that as they descend if the box is out of position it will be forced over by this wedge action, it being held in the other direction continuously by means of the spring 37.

Figure 5:
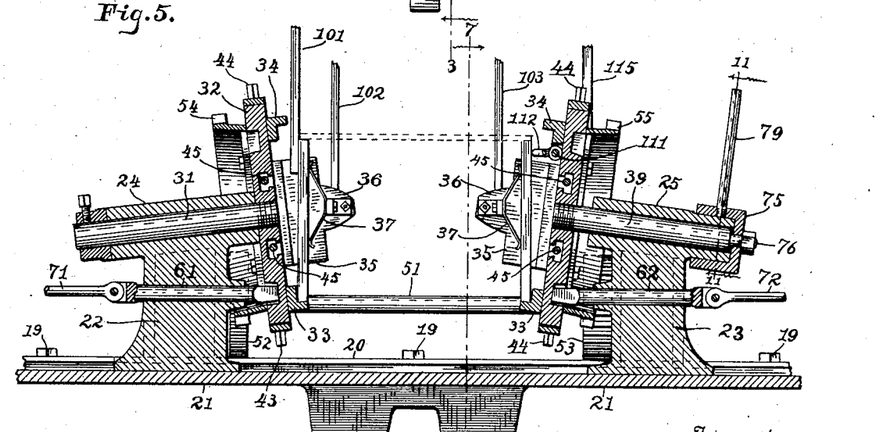
Fig. 5, a detail vertical sectional view through the box-holding chucks and immediately adjacent parts as seen from the point indicated by the dotted lines 5 5 in Fig. 4 when looking in the direction indicated by the arrows, said view, however, containing the box-heads and illustrating the relative positions of the parts just before a box side is put in place and before the nail-drivers descend.

When the shook which becomes the left-hand box-head is put in place, it is held to proper position by the flange 33, the guide 101, and the yielding support 37. The shook which is to become the box-head at the right-hand end, however, has at first no support such as provided by the guide 101, but lies over against the surface of the box chuck-head. It must, however, be thrown to upright position before the guide 105 descends, and I therefore provide upon the box-head chuck a rock-shaft 111, bearing cam-fingers 112, which are adapted to be thrown up against the shook and straighten it up into approximately proper position, as best shown in Fig. 5. A weight-arm 113 aids the shaft to rock back to normal position except when forcibly rocked in the other direction by the means provided. The hub of this weight-arm 113 also serves as a bearing for the operating-finger 114, which is pivoted thereto. A bracket 115 is carried upon the cross-head 91, and upon this an adjustable member 116 is mounted, which has an arm 117, which extends out into the path of the finger 114. As the cross-head 91 descends the arm 117 strikes the finger 114 and rocks the shaft 111, causing the cam-fingers 112 to force the head up to position, as shown in Fig. 5. The arm 117 passes below the finger 114 before the conclusion of its stroke, and consequently it is necessary that the finger 114 should yield sufficiently to permit it to pass back. The means by which this is permitted is best illustrated in Fig. 10, where the position of the finger as the arm passes up is indicated by means of dotted lines.

The operations incident to the use of a machine embodying my invention may be briefly recapitulated as follows: The box-head chucks are first properly positioned and the head-shooks placed therein. One side shook is then laid thereon and the machine caused to move in the ordinary way. The various shooks are brought into exactly proper relation by the automatically-operated guides before the nails are driven, the nail-driving being done at the concluding portion of the movement. The nail-chucks and nail-drivers reascend to their original position, the box-head chucks containing the partially-treated box are revolved, and the bottom shook nailed on in the same way. The nail-chucks and nail-drivers again reascend, the box-head chucks again revolve, the other side shook is placed in position, the machine again operated, and the box is completed. The handle 79 may then be moved by the operator drawing the right-hand box-head chuck away somewhat from the other, which permits the box to be freely removed. In each case when the box-head chuck is revolved it brings that part of a box-head which is to be nailed directly under the plungers or nail-drivers of the nailing-machine, where it remains stationary while the nails are being driven. Each time it is desired to revolve the box-head chucks the operative steps upon the treadle 63, which withdraws the latch-pins 61 and 62, thus permitting the desired movement.

Instead of causing the cross-head 91, carrying the nail-chucks, to move vertically on slides a part of the distance that the cross-head 81 moves I may instead attach the cross-head 91 rigidly to the frame-uprights 15 and 16 in the ordinary and well-known manner and then provide means for moving the table 21 vertically a suitable distance and at the proper time, which will have the same effect, so far as providing room for convenient handling of the box is concerned, as the movement of the cross-head 91 heretofore described. I have illustrated a means for doing this in Fig. 14 of the drawings, where the cross-head 91 is shown as stationary, while the table 21 is shown as capable of vertical movement synchronously with the cross-head 81 by means of cams 125, mounted on a rock-shaft 126 and operated by pitman 127, connecting the reciprocating cross-head 81 with arms 128 on shaft 126. The cam 125 is shown as traveling in contact with antifriction-trucks 129, mounted on a suitable part of the structure of table 21. I consider the movement of table 21 toward and from the nail-chuck brackets as the equivalent of the movement of the nail-chuck-carrying brackets toward and from the table 21, the result being in each case that suitable space is provided for convenient handling and removal of the box or partially-finished box at the time when the nail-drivers have been withdrawn. While I have shown but one alternative construction, I consider any means for effectuating this movement as within the scope of my invention.

Figures 12, 13, 14, 15:
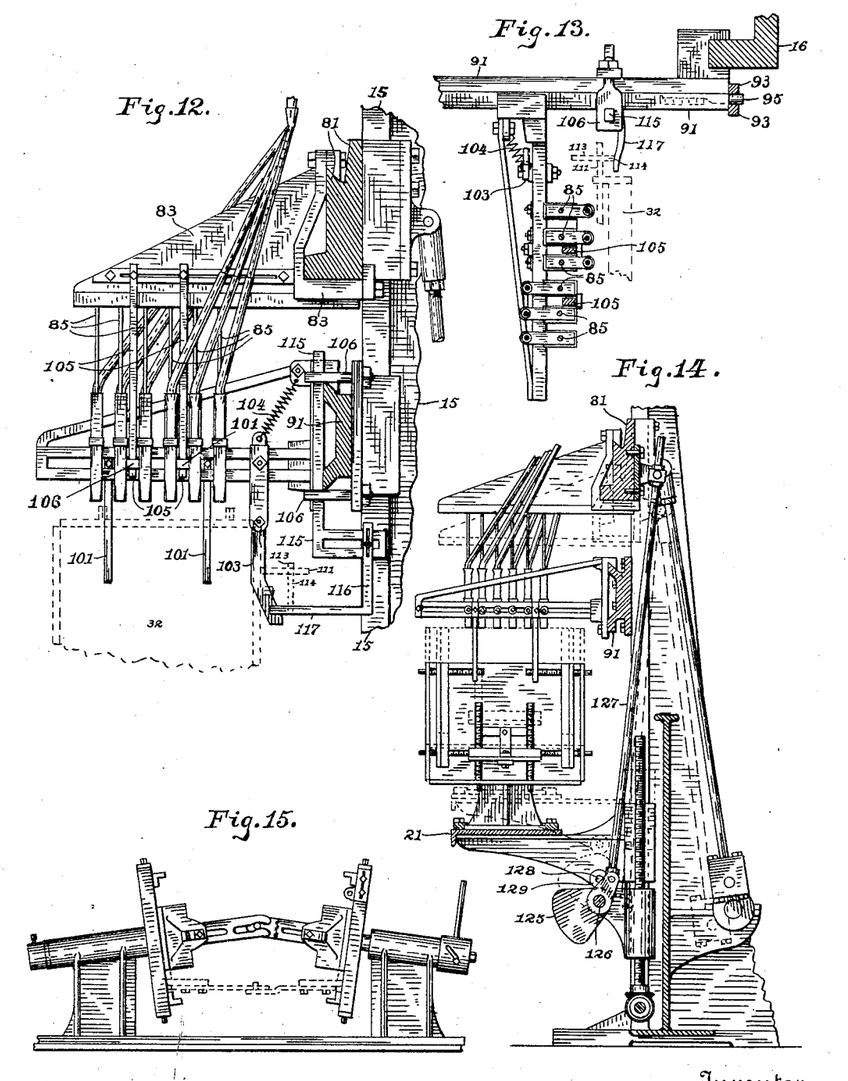
Fig. 12, a detail view, on an enlarged scale, as seen when looking in the direction indicated by the arrows from the dotted line 12 12 in Fig. 1.
Fig. 13, a detail horizontal sectional view as seen when looking downwardly from the dotted line 13 13 in Fig. 1.
Fig. 14, a view illustrating an alternative construction wherein the box-supporting table is caused to approach and recede from the nail-chuck-carrying brackets instead of vice versa.
Fig. 15, a view of alternative means of connecting the two box-head chucks, whereby they are caused to revolve in unison.

By Fig. 15 I have shown an alternative means of connecting the two box-head chucks so that they will revolve in unison, which consists in arms extending out from said chucks toward each other and united where they meet by suitably-formed slot-and-pin connection. While I do not regard this as quite as desirable as the shaft-and-gear arrangement illustrated in the principal figures of drawings, I still regard it as the equivalent thereof, as it secures synchronous revolution of the two box-head chucks. Other means of connecting these box-head chucks so that they will revolve in unison may of course be provided, but I consider all such within the scope of my invention.

Having thus fully described my said invention, what I claim as new, and desire to secure by Letters Patent, is—

1. The combination, in a nailing-machine, of a pair of relatively adjustable box-head chucks which face each other and receive and carry the box-shooks while being nailed, spindles on which said chucks are mounted, and means for revolving said chucks.

2. The combination, in a nailing-machine, of a pair of box-head chucks, and inclined spindles on which said chucks are mounted.

3. The combination, in a nailing-machine, of a pair of box-head chucks, flanges on the facing surfaces of said chucks upon which the box-heads may rest while the sides and bottoms of the box are being nailed thereto, and means for adjusting said flanges.

4. In a nailing-machine, a pair of box-head chucks hung on spindles that vary from a horizontal position and are provided with supporting-flanges for the box-heads, whereby those flanges which at the time are lowest may be brought directly below the nail-drivers, while the opposite flanges are kept out of the path of said nail-drivers, thus permitting the nail-chucks to descend within the upper edges of the box-head chucks during the nailing operation, in combination with said spindles.

5. In a nailing-machine, a pair of box-head chucks provided with adjustable head-supporting flanges whereby they are adapted to hold boxes of varying sizes and diameters.

6. In a box-nailing machine, the combination, with a pair of relatively adjustable box-head chucks for carrying the boxes during the nailing operation, of means for connecting said chucks and causing them to revolve in unison.

7. The combination, in a box-head chuck of a nailing-machine, of the main chuck-plate, flanges thereon, and a rock-shaft suitably positioned in relation thereto and carrying cam-fingers whereby after the box-head is placed in the said chuck it may be thrown out to perpendicular position.

8. The combination, in a nailing-machine, of a table, a pair of revoluble box-head chucks mounted thereon, the nail-chucks, the nail-drivers, means whereby during the nailing operation the distance between the nail-chucks and the box-head chucks is varied, a cam on one box-head chuck for throwing the box-heads up into perpendicular position ready to be nailed, and means actuated by the machine for operating said cam.

9. In a nailing-machine, a box-head chuck provided with a cam whereby the box-head may be thrown up to position to be nailed while the one side of the box is being nailed on, and then thrown back out of the way while the other sides of the box are nailed on.

10. In a nailing-machine, a revoluble box-head chuck provided with supporting-flanges and yielding supports, in combination with guides adjacently positioned and arranged to operate in conjunction therewith.

11. In a nailing-machine, the combination, with a box-head chuck, of a device for moving the same axially, whereby the distance between said box-head chuck and its fellow may be increased or diminished.

12. The combination, in a box-nailing machine, of a table, a pair of box-head chucks mounted thereon, nailing mechanism, and guides carried from said nailing mechanism for supporting and guiding the sides and bottom of the box accurately while being nailed onto the heads in the chucks.

13. The combination, in a nailing-machine, with box-head chucks adapted to revolve, of locking-pins for holding said chucks in adjusted position while the nailing operation is performed.

14. The combination, in a nailing-machine, of box-head chucks, locking-pins for holding said chucks in adjusted position during the nailing operation, a treadle, and links and levers connecting said treadle to said pins, whereby the same are operated.

15. The combination, in a box-nailing machine, of box-head chucks, locking-pins for holding said chucks to proper position during the nailing operation, a treadle for disengaging said locking-pins, links and levers connecting the treadle and said pins, and a spring for holding said pins into engagement when not forcibly withdrawn by means of the treadle.

16. The combination, in a nailing-machine, of a table, standards containing bearings adjustably mounted thereon, and box-head chucks mounted in said bearings.

17. The combination, in a nailing-machine, of a table, standards containing inclined bearings mounted thereon, and box-head chucks the spindles whereof are mounted in said inclined bearings.

18. The combination, in a nailing-machine, of a table, standards adjustably mounted thereon, box-head chucks mounted in bearings in said standards, and means connecting said box-head chucks whereby they are caused to move in unison when revolved, said means being likewise adjustable.

19. The combination of a table, suitable bearings carried thereby, relatively adjustable box-head chucks mounted in said bearings, and means connecting said box-head chucks whereby they are caused to move in unison when revolved.

20. The combination, in a nailing-machine, of a table, suitable bearings carried thereby, box-head chucks mounted in said bearings and provided with toothed rims, a shaft also mounted on said table adjacent to said box-head chucks and provided with gears which intermesh with the toothed rims thereon, whereby said box-head chucks are caused to move in unison when revolved.

21. The combination, in a nailing-machine, of a table, suitable bearings carried thereby, box-head chucks mounted in said bearings, means for moving one of said box-head chucks toward and from the other, and means connecting said box-head chucks whereby they are caused to move in unison said means embodying variable connection with one of said box-head chucks whereby the movement of said box-head chucks toward and from each other is permitted without disengagement of the means whereby they are caused to move in unison when revolved.

22. The combination, in a nailing-machine, of a table, suitable bearings carried thereby, box-head chucks mounted in said bearings, means for moving one of said box-head chucks toward and from the other, and means connecting said box-head chucks whereby they are caused to move in unison, comprising a shaft, gears thereon, and gear-rims on the box-head chucks, one of said gears on the shaft being wide enough to maintain engagement with the corresponding gear-rim at all points during the movement of said box-head chuck toward and from its fellow.

23. The combination, in a nailing-machine, of a table, a pair of revoluble box-head chucks mounted thereon, means for revolving said chucks and the box carried thereby between the steps of the nailing operation, the nail-chucks, the nail-drivers, and means for varying the distance between the nail-chucks and the box-head chucks whereby the corners of the box being nailed are permitted to pass as the chucks are revolved.

24. The combination, in a nailing-machine, of a table, standards containing bearings mounted thereon, box-head chucks revolubly mounted in said bearings, the nail-chucks, the nail-drivers, means for revolving the box-head chucks and the box carried thereby between the steps of the nailing operation, and means for varying the distance between the nail-chucks and the box-head chucks between the steps of the nailing operation whereby the corners of the box being nailed are enabled to pass the nail-chucks and whereby the sides of the box are brought back into proper relation to said nail-chucks to be nailed.

25. The combination, in a box-nailing machine, of a table, a pair of box-head chucks revolubly mounted thereon, nailing mechanism, means for varying the distance between the box-head chucks and the nailing mechanism, and guides carried from said nailing mechanism for supporting and guiding the sides and bottom of the box accurately while being nailed onto the box-heads in the chucks.

In witness whereof I have hereunto set my hand and seal, at Indianapolis, Indiana, this 10th day of August, A. D. 1903.

JASON H. GREENSTREET. [L. S.]

Witnesses:
CHESTER BRADFORD,
JAMES A. WALSH.